United States Patent [19]
Dehm

[11] Patent Number: 5,956,881
[45] Date of Patent: Sep. 28, 1999

[54] DISPENSER FOR USE IN TREATING ARTIFICIAL FLIES

[76] Inventor: Henry C Dehm, 3003 E. 4505 South, Salt Lake City, Utah 84117

[21] Appl. No.: 08/841,500

[22] Filed: Apr. 23, 1997

Related U.S. Application Data

[60] Provisional application No. 60/015,958, Apr. 24, 1996.

[51] Int. Cl.$^6$ .................................................. A01K 97/06
[52] U.S. Cl. ...................................................................... 43/4
[58] Field of Search ................................... 43/4; 34/89.1, 34/95, 95.1

[56] References Cited

U.S. PATENT DOCUMENTS

| | | | |
|---|---|---|---|
| 2,052,021 | 8/1936 | Drachman | 34/89.1 |
| 2,517,089 | 8/1950 | Dean | 34/89.1 |
| 4,771,564 | 9/1988 | Whitley | 43/4 |
| 5,097,616 | 3/1992 | Johnson | 43/4 |
| 5,297,354 | 3/1994 | McGriff | 43/4 |
| 5,339,554 | 8/1994 | Lippens | 43/4 |

*Primary Examiner*—Kurt Rowan
*Attorney, Agent, or Firm*—Terry M. Crellin

[57] ABSTRACT

A device used in fishing has first and second, water absorbing, substantially planar, drying pads. A first polymeric bag lies along one of the drying pads. A hydrophilic, thixotropic material is contained inside the first polymeric bag. A small hole is located closely adjacent to or at a lower corner of the first polymeric bag, such that the hydrophilic, thixotropic material will be retained in the first polymeric bag unless the first polymeric bag is squeezed to extrude the hydrophilic, thixotropic material from the first polymeric bag. A second polymeric bag lies along the other of the drying pads. A sheet of open celled, foamed polymeric material is contained in the second polymeric bag. Finely powdered amorphous hydrophobic fumed silica is also contained in the second polymeric bag, with the fumed silica permeating the open cells of the sheet of open celled, foamed polymeric material. A pin hole is provided in a side wall of the second polymeric bag. When the second polymeric bag is squeezed an air dispersion of fumed silica is ejected from the pin hole. The first and second drying pads and the first and second polymeric bags are arranged so that (1) the first and second drying pads lie alongside each other, (2) the first polymeric bag lies alongside a broad surface of the first drying pad, and (3) the second polymeric bag lies alongside a broad surface of the second drying pad. The upper ends of the first and second drying pads and first and second polymeric bags are bound together.

9 Claims, 3 Drawing Sheets

DISPENSER FOR USE IN TREATING ARTIFICIAL FLIES

THIS APPLICATION CLAIMS THE BENEFIT OF U.S. PROVISIONAL APPLICATION NO. 60/015,958, filed Apr. 24, 1996.

BACKGROUND OF THE INVENTION

1. Field of the Invention

The present invention relates to a device for the efficient and rapid application of hydrophobic and hydrophilic substances to the surfaces of artificial flies, fishing lines and leaders used on fishing lines to make those items either float or sink as desired.

2. State of the Art

Usually to fish effectively with a dry fly, the fly should float high on the water surface without breaking through the surface film, and the leader close to the fly should break the surface film and sink. This is accomplished by coating the fly with a thin film of a hydrophobic substance of low volatility and low solubility in water or by coating the fly with certain finely divided, non-volatile, water-insoluble, hydrophobic solids. Conversely, if it is desired to make the fly, fishing line or leader sink, the fly, fishing line or leader is treated with a hydrophilic substance in order to make the item break through the surface of the water and sink.

When a fish is caught and the hydrophilic mucous inside the mouth of the fish is transferred to the fly. The fly then tends to sink at least until the hydrophilic material on the fly is removed. To properly remove the hydrophilic material, the fly must be cleaned to remove the mucous and any other hydrophilic contaminant on the fly. The fly then must be dried.

Many different materials can be used to treat the surface of artificial flies, fishing lines and leaders to tailor the surface properties of the treated items. These materials can be fluids or solids. When the material to be used in treating artificial flies, fishing lines and leaders is a solid, it is desirable for the solid to melt at or just below body temperature to facilitate application of the material to the item being treated. Fluid materials, such as oils, greases, gels, and pastes are also used in treating artificial flies, fishing lines and leaders. All of these materials are applied to the item to be treated by transferring the material from one's finger tips to the item being treated.

After cleaning the artificial fly, fishing line or leader, it is advantageous to dry the item. Inorganic desiccators in the form of particulates have been used to dry flies. The desiccators have a limited capacity for removing water from a fly and are usually discarded when that capacity is exceeded. Thermal treatment can regenerate the desiccator, but is impractical.

An artificial fly can be dried by pressing it between two pads of amadou, a scarce tree fungus. Unfortunately, amadou is a hard, inflexible material and is not recommended for use on small, delicate, artificial flies. Amadou is also very expensive, being over 50 times more costly than the soft, flexible, long-lasting cellulosic material described in this patent.

There are hydrophobic materials being used by fishermen that melt at or just below body temperature and are dispensed from a squeeze bottle. To keep such materials molten, the bottle must be stored in a pocket of the fisherman, and the pocket must be positioned against the body of the fisherman so that the temperature within the pocket exceeds the melting point of the hydrophobic substance. The tip of the bottle often clogs, especially on a cold day, and must be warmed with the fingers of the fisherman to get the material to flow from the bottle. Any advantage of using such a material is off-set by the inconvenience associated with storing and dispensing of the material.

The low viscosity fluids, solutions and low melting materials used to treat artificial flies, fishing lines and leaders are usually stored in and dispensed from squeeze bottles, wide-mouth screw-cap bottles or aerosol cans. Because aerosols are harmful to the environment, they are being phased out in favor of relatively expensive bottles that are provided with finger-operated pumps.

Organic solvents have been used in many materials used to treat fishing equipment. However, such solvents are generally bad for the environment, and when an artificial fly is treated with a material containing an organic solvent, the solvent further must be allowed to evaporate from the fly by false casting prior to making a desired, normal cast. False casting is a waste of time and energy and, even worse, can scare the fish.

Gels, pastes and particulates that are used in treating flies, fishing lines and leaders must be stored and dispensed from screw cap or flip-top jars. As fly fisherman are all too well aware, the dispensers currently employed are bulky, heavy, inconvenient to store and especially inconvenient to use since holding, opening, using, closing and then storing them tie up the hands and waste time.

In the process of treating a fly, fishing line or leader, the container or parts thereof can be dropped or the contents spilled. This is especially true on cold, wet, windy days. Elaborate container holders have been suggested which are attached to the fishing vest or other garment of the fisherman in order to prevent such loss. However, they add to the cost, bulk and weight of the dispenser of material used to treat flies, fishing lines and leaders.

There is clearly a long felt need for a faster, more convenient and less expensive way to clean and control the wetting properties of artificial flies, fishing lines and leaders without running the risk of contaminating the items with an improper surface treatment agent.

OBJECTIVES AND SUMMARY OF THE INVENTION

A principal objective of the present invention is to provide a device for thoroughly drying artificial flies used in fishing in a rapid manner as well as for dispensing hydrophobic and hydrophilic substances to be applied to artificial flies, fishing lines and leaders, wherein the device is relatively small, easy to use and will allow the fisherman to dry and treat artificial flies, fishing lines and leaders with ease and without incurring cross contamination of treatments on the treated items.

A further objective of the present invention is to provide such a device which includes (1) a dispenser for a hydrophilic material that is used to clean artificial flies or to coat artificial flies, fishing lines and leaders that are intended to sink in water, (2) a means for drying cleaned flies, and (3) a dispenser for a hydrophobic material used to treat dried artificial flies so that the flies will float on water.

A still further objective of the present invention is to provide such a device that is contained in an easily opened wallet-type container, wherein the device is easy to use, the device can be disassembled to replace any material that has become worn or depleted and further wherein the device is made of materials that are not harmful to the environment, the fish or the fisherman.

The above objectives are achieved by providing a simple, relatively small, easy to use device that will allow a fisherman to quickly and easily clean an artificial fly by dispensing a small amount of hydrophilic material on the fisherman's finger to be used to clean the artificial fly. The hydrophilic material can also be used to treat artificial flies, fishing lines and leaders to render the treated items so that they will break through the surface of the water and sink. The device of the present invention will dispense small, easily controlled amounts of the hydrophilic material so that the material can easily be controlled to treat only those items intended to be treated without cross contamination or inadvertent treatment of items that are not intended to be treated.

The device of the present invention is further provided with a pair of water absorbing, substantially planar, drying pads. A cleaned dry fly can quickly be rinsed in the water of the stream or lake on which one is fishing. The rinsed fly is quickly and easing dried by squeezing the fly between the pair of drying pads.

The hydrophilic material is contained in a first polymeric bag that is made of flexible polymeric side walls that are substantially planar and parallel with each other. The side walls are sealed together about their periphery to form an enclosed space between the side walls in which the hydrophilic material is contained. The hydrophilic material comprises a thixotropic agent and a non-toxic, substantially non-volatile liquid that contains hydroxyl or other polar groups and is, in addition, a good surfactant. The mixture of the thixotropic agent and the hydrophilic material forms a thixotropic material that does not flow unless it is forced to do so by being pushed or otherwise agitated to produce shearing forces in the material.

A small hole having an effective diameter no greater than about 1/8 inch is located closely adjacent to or at a lower corner of the first polymeric bag. The hydrophilic, thixotropic material is retained in the first polymeric bag unless the bag is squeezed to extrude the hydrophilic material from the small hole in the bag.

The device of the present invention further includes a second polymeric bag that is made of flexible polymeric side walls that are substantially planar and parallel with each other. The side walls of the second polymeric bag are sealed together about the periphery of the side walls to form an enclosed space between the side walls of the second polymeric bag. A sheet of open celled, foamed polymeric material is contained in the enclosed space between the side walls of the second polymeric bag.

Finely powdered amorphous hydropholoic fumed silica is contained in the enclosed space between the side walls of the second polymeric bag. The finely powdered fumed silica permeates the open cells of the sheet of open celled, foamed polymeric material that is positioned in the second polymeric bag. A pin hole is provided in one of the side walls of the second polymeric bag. The pin hole has an effective diameter of between about 10 and 50 mils. When the second polymeric bag is squeezed, an air dispersion in the form of a small cloud of fumed silica is ejected from the pin hole.

The first and second drying pads and the first and second polymeric bags are arranged and held together so that (1) the first and second drying pads lie alongside each other, with a first broad surface of the first drying pad facing a first broad surface of the second drying pad, (2) the first polymeric bag lies alongside a second broad surface of the first drying pad, and (3) the second polymeric bag lies alongside a second broad surface of the second drying pad, with upper ends of the first and second drying pads and first and second polymeric bags being bound together so that the first and second drying pads and the first and second polymeric bags can be fanned open similar to pages of a book.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE PREFERRED EMBODIMENTS

Figure 1:
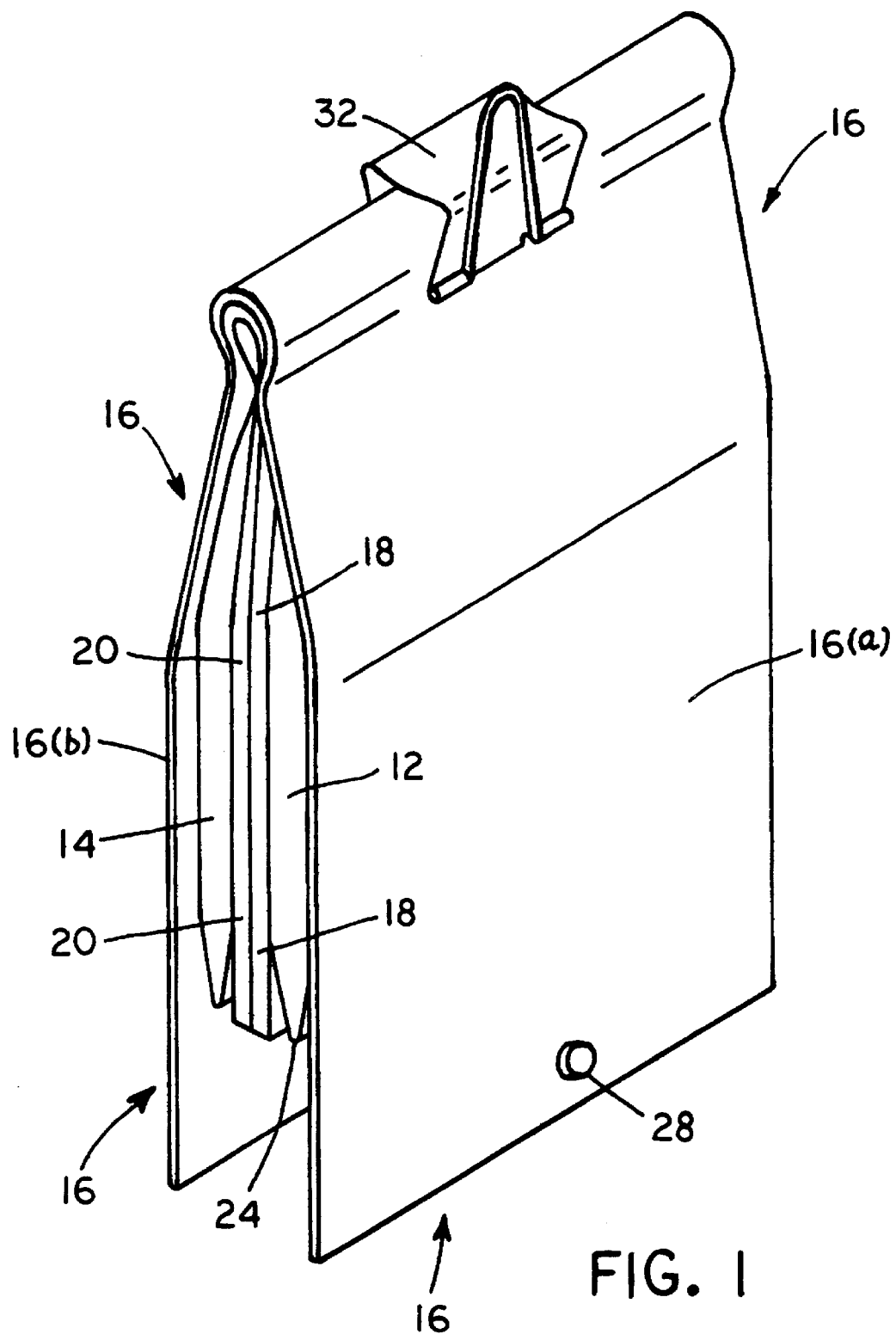
FIG. 1 is a pictorial view of one preferred embodiment of the device of the present invention.

The device of the present invention, as illustrated in the drawings and described herein comprises two polymeric bags 12 and 14. Each bag is preferably made of polymeric side walls having dimensions of about two inches by three inches. The polymeric side walls are preferably made of 2 mil polyethylene. These bags hereafter will be referred to simply as polymeric bags.

A wallet-like cover 16, as will be described more fully hereinafter, protects the polymeric bags 12 and 14 and a pair of drying pads 18 and 20. The drying pads 18 and 20 are located between polymeric bags 12 and 14.

The first bag 12 contains a thixotropic mixture 13 of bentonite clay or hydrophilic amorphous fumed silica and a surfactant liquid that is a non-toxic, substantially non-volatile liquid containing hydroxyl or other polar groups. The second bag 14 contains a sheet 22 of open celled, foamed polymeric material. As will be described more fully hereinafter, a finely powdered amorphous hydrophobic fumed silica 15 is contained in the second bag 14, with the fumed silica permeating the open cells of the sheet 22 of open celled, foamed polymeric material.

A small hole 24 having an effective diameter no greater than about 1/8 inch is located closely adjacent to or at a lower corner of the first polymeric bag 12. The hydrophilic, thixotropic material contained in the first polymeric bag 12 is retained in the first polymeric bag 12 unless the first polymeric bag 12 is squeezed to extrude the hydrophilic, thixotropic material from the small hole 24 in the first polymeric bag 12.

Finely powdered amorphous hydrophobic fumed silica 15 is contained in the enclosed space between the side walls of the second polymeric bag 14, with the fumed silica permeating the open cells of the sheet 22 of open celled, foamed polymeric material that is positioned in the second polymeric bag 14. A pin hole 26 is provided in one of the side walls of the second polymeric bag 14. The pin hole 26 has an effective diameter of between about 10 and 50 mils. When the second polymeric bag 14 is squeezed an air dispersion in the form of a small cloud of fumed silica is ejected from the pin hole 26.

The first and second drying pads 18 and 20 and the first and second polymeric bags 12 and 14 are arranged and attached together so that (1) the first and second drying pads 18 and 20 lie alongside each other, with a first broad surface of the first drying pad 18 facing a first broad surface of the second drying pad 20, (2) the first polymeric bag 12 lies alongside a second broad surface of the first drying pad 18, and (3) the second polymeric bag 14 lies alongside a second broad surface of the second drying pad 20. The upper ends of the first and second drying pads 18 and 20 and first and second polymeric bags 12 and 14 are bound together so that the first and second drying pads 18 and 20 and the first and second polymeric bags 12 and 14 can be fanned open similar to pages of a book.

A cover 16 is provided comprising a front protective cover portion 16(a) that is attached at an upper end thereof to the bound upper ends of the first and second drying pads 18 and 20 and the first and second polymeric bags 12 and 14. The cover 16 further comprises a back protective cover portion 16(b) that is attached at an upper end thereof to the bound upper ends of the first and second drying pads 18 and 20 and the first and second polymeric bags 12 and 14.

The front protective cover portion 16(a) extends downwardly along an outer side of one of the first and second polymeric bags 12 and 14 so that the bottom end of the front protective cover portion 16(a) extends beyond lower ends of the first and second drying pads 18 and 20 and the first and second polymeric bags 12 and 14. The back protective cover portion 16(b) extends downwardly along an outer side of another of the first and second polymeric bags 12 and 14 so that a bottom end of the back protective cover portion 16(b) extends beyond lower ends of the first and second drying pads 18 and 20 and the first and second polymeric bags 12 and 14.

Figure 2:
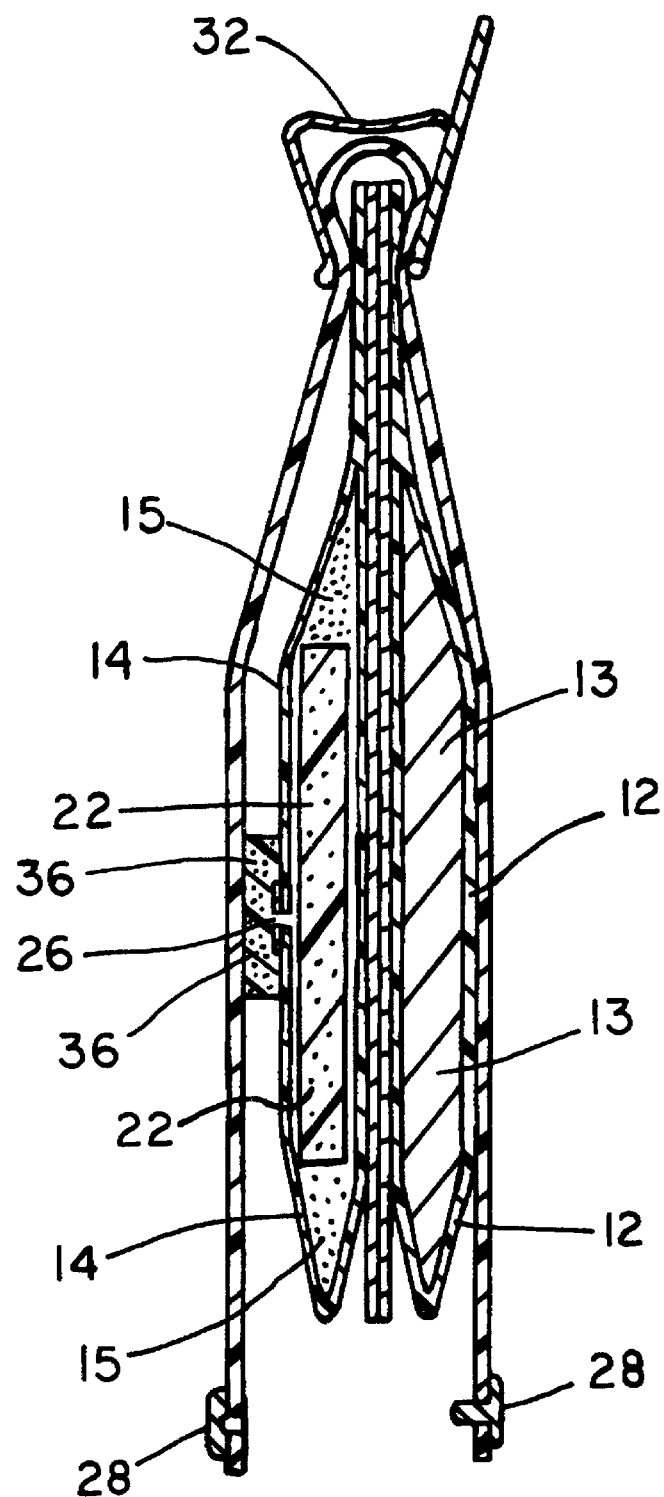
FIG. 2 is a cross section view of the device of FIG. 1 taken along line 2—2 of FIG. 1.
Figure 3:
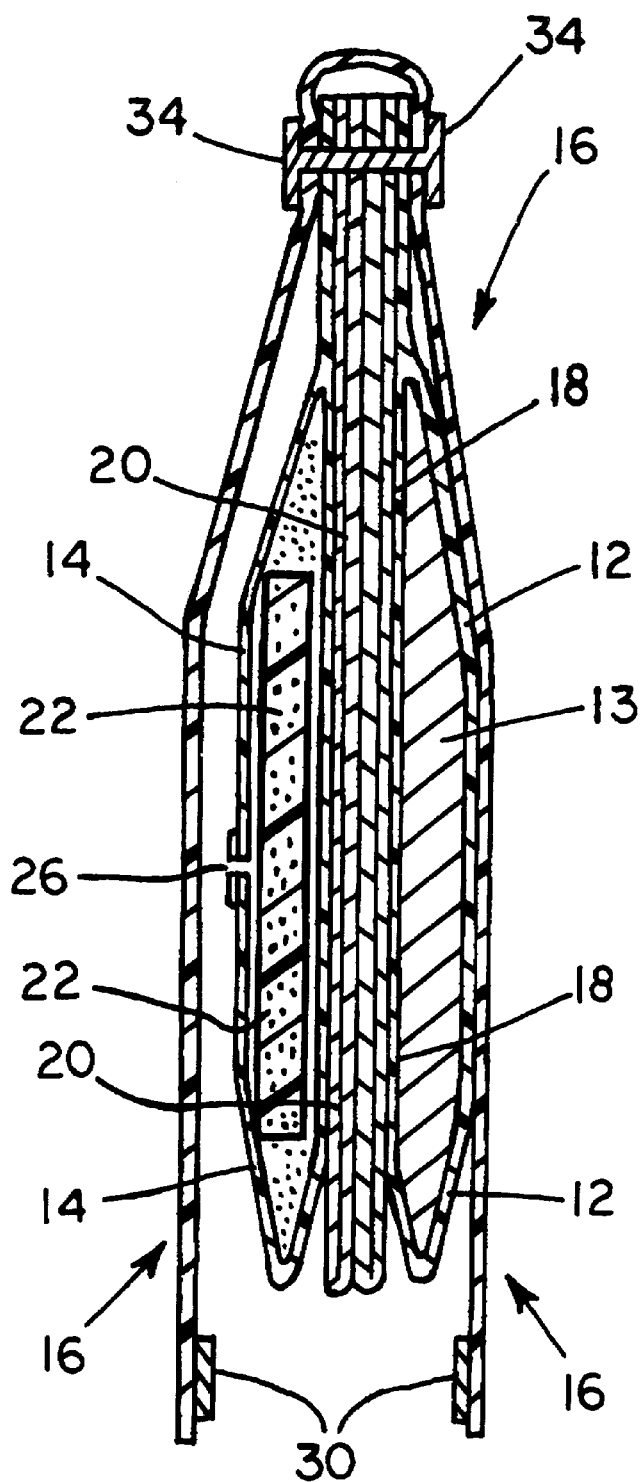
FIG. 3 is a cross section view similar to that of FIG. 2 but showing modifications in the device.

Attachment means are provided for releasably attaching the bottom ends of the front and back cover portions together. The attachment means can be a snap holder 28 as shown in FIGS. 1 and 2 of the drawings or a hook and pile attachment 30 as shown in FIG. 3 of the drawings. The upper ends of the polymeric bags 12 and 14, the drying pads 18 and 20 and the cover 16 can be held tightly together by a binder clip 32 shown in FIGS. 1 and 2 of the drawings or a screw and post type holder 34 as shown in FIG. 3 of the drawings.

In a preferred embodiment of the present invention, the pin hole 24 in the second polymeric bag 14 is located on a side wall of the second polymeric bag 14 that faces one of the front or back protective cover portions 16(a) or 16(b). A layer 36 of closed celled, foamed polymeric material is attached to an inside surface of one of the front or back protective cover portions 16(a) or 16(b), so that when the bottom ends of the front and back protective cover portions 16(a) and 16(b) are attached together, the layer 36 of closed celled, foamed polymeric material is held in contact with the pin hole 26 in the second polymeric bag 14.

The invention will now be further described by giving descriptions of particular uses of the device of the invention along with additional descriptive matter of the device.

Cleaning Files, Leaders and Fishing Lines

Ideally, the formulation for the hydrophilic, thixotropic material which can be used for cleaning flies, leaders and fishing lines, is also effective, when desired, for treating the same items so that the items will break through the surface of the water and sink. The formulation should be heavily thixotroped to prevent unwanted leakage from the first polymeric bag 12. Bentonite clay and/or hydrophilic amorphous fumed silicas work very well as thixotroping agents. The bentonite clay, as compared to fumed silicas, is easier to handle, is much less expensive, has a higher specific gravity (2.7 vs. 2.2) which is important in causing tippets, etc. to sink. The bentonite clay is available in food grade (325 mesh) and cattle feed grade (200 mesh). The bentonite clay is preferred because it is less expensive. Both bentonite clay and the fumed silicas give excellent products and mix well at room temperature with the hydrophilic liquid described below.

There are five important consideration when choosing a hydrophilic liquid for the thixotroped hydrophilic formulations. First, the liquid should contain hydroxyl or other polar groups in order to form thixotropes easily via hydrogen bonding. Second, the liquid should be non-volatile. Third, the liquid should be inexpensive. Fourth, the liquid should be non-toxic. Fifth, the liquid should be effective as both a wetting agent (to break through the water surface film and to promote rapid sinking of tippets, etc.) and as a detergent (to clean flies, leaders and fishing lines rapidly).

Food grade polyethylene glycols are particularly attractive hydrophilic liquids to be used in the present invention because of their low vapor pressure, low freezing point and low cost. In addition they are non-toxic commercial products, chemically stable to over 200° C. and safe for repeated skin contact. Also, they do not support mold growth.

In an exemplary example of making the hydrophilic, thixotropic material for use in the present invention, food grade polyethylene glycols were blended to give a clear, colorless liquid mixture having a freezing point of about 30° F.

Food grade bentonite clay was dispersed in the blended glycols by ordinary stirring. At a 40% clay level, the thixotropic mixture at rest did not flow over the temperature range of 40° F. to over 100° F., and in that range the thixotropic mixture had the appearance of chocolate pudding and flowed easily under shear. At 43° F. the mixture began to stiffen. At 39° F. it had the consistency of soft taffy, and at 36° F., the thixotropic mixture had the consistency of ordinary taffy. At 25° F., the thixotropic mixture became very hard. When a beaker half full of this mixture at a temperature of 70° F. was inverted, the mixture did not flow. The results were essentially the same when animal feed grade bentonite clay was used in place of the food grade bentonite clay. The resulting thixotropic mixtures were very effective for cleaning flies, leaders and fishing lines and also for causing flies, leaders and fishing lines to sink.

The hydrophilic, thixotropic material is contained in the first polymeric bag 12. Care should be taken not to trap air in the polymeric bag 12 when the thixotropic material is introduced into the bag 12. A small hole 24 (no greater than 1/8" and preferably about 1/64 to about 1/32 inch across) is made in the bag 12 by cutting a corner of the bag 12 diagonally. By carefully squeezing the bag 12, the desired amount of the thixotropic material can be easily extruded through the hole 24 on to a finger tip. Material is moved to the hole periodically by a simple finger motion similar to the one used to milk a cow. In this manner, essentially all of the contents of the bag 12 can be extruded from the bag 12.

To clean a drowned fly, a small amount of the thixotropic material is extruded from the bag 12 and then transferred via the finger tips of the user to a mucous-contaminated fly that will not float because of the mucous on the fly. The thixotropic material is worked gently but thoroughly into the fly with the tips of one's thumb and forefinger. The thixotropic material is then removed from the fly by shaking the fly under water. The contaminants are washed from the fly and the fingers along with the thixotropic material. The entire operation takes about 5 seconds.

Drying a Fly

Non-woven felts are attractive drying agents provided that they absorb large amounts of water rapidly and reversibly. In general, the non-wovens used in incontinence products absorb large amounts of water but irreversibly, thus limiting their usefulness. The water absorbed becomes part of an immobile gel structure invent holds water tenaciously. In the present invention, the drying agent must be capable of releasing captured moisture, i.e., dry itself, so that it can be used over and over.

A non-woven that works extremely well is 416-SHB, a product made by Absorbent Systems, Northhampton, Mass. Water is absorbed by the pad by capillary action and is loosely held by the hydroxyl groups in the cellulosic fibers via hydrogen bonding. Since these bonds are weak, all of the absorbed water evaporates from the pads at a rate that increases with temperature. A pad 2 inches by 6.3 inches and weighing 1.10 gram absorbed 6.5 grams (1.3 teaspoonsful) of water instantaneously. At 68° to 720° F. in still air, relative humidity 45%, the pad lost 50% of the absorbed water in 150 minutes, 78% in 240 minutes and 100% in 360 minutes. This pad was folded in half to give two drying pads 18 and 20 (hinged at the top as shown in FIG. 2), with each pad having a dimension of 2 inches by 3.15 inches. A water-logged size 20 Orvis blue wing olive dry fly held gently between the two pads 19 and 20 was dry and ready for application of the floatant (see below) within seconds.

After much use, single thickness drying pads 18 and 20 as shown in FIG. 2 tend to delaminate at their raw edges. This is easily prevented by coating the edges lightly with a rubber cement or other water resistant adhesive. Double thickness drying pads 18(*a*) and 20(*a*) can be used as shown in FIG. 3. The raw side edges of the pads 18(*a*) and 20 (*a*) can still benefit from being coated with an adhesive.

Providing Fly with a Hydrophobic Coating

There are many materials available to coat a dry fly so that it floats on water. We have converted several non-volatile hydrophobic liquids, oils and low melting solids to gels and pastes with the aid of a hydrophobic amorphous fumed silica. These materials were transferred easily from a polymeric bag such as the first bag 12 in a process similar to that described previously for the formulation used for cleaning flies. They all work well but are messy. In particular the fingers become contaminated with water-insoluble material which is difficult to wash off and can be transferred easily, for example, to the leader at a time when it is desirable to have the leader sink.

The system of the present invention using the second polymeric bag 14 is much preferable to using the liquids, oils and low melting solids as described in the preceding paragraph. The second bag 14 contains a sheet 22 of open-ceiled, foamed polymeric material. Any highly flexible, porous, open-celled, foamed polymeric material can be used as the sheet 22 in the second bag 14. However, it has been found highly advantageous to use an open-celled, foamed polymeric material, such as Polinazell 30 which is an open-celled, foamed polyether having a void volume of about 97%. The Polinazell 30 material is marketed by Swisstex, Inc. of Greenville, S.C. and is commonly used as filter material in home aquariums. The sheet 22 will generally have dimensions of about 2.75 inches by 1.75 inches and a thickness of about 0.25 inch. About 0.70 to 1.3 grams of sub-micron amorphous hydrophobic fumed silica is contained in the second polymeric bag 14 along with the sheet 22 of open-celled foamed polymeric material. The fumed silica permeates the open structure of the sheet 22 of open-celled foamed polymeric material. The fumed silica can be obtained under the tradename CAB-O-SIL TS-530 from Cabot Corporation, Tuscola, Ill.

The second polymeric bag 14 is provided with a pin hole 26 that has an effective diameter of between about 10 to 50 mils. The location of the pin hole 26 is not critical. The pin hole 26 can advantageously be located about one inch from the bottom of the bag 14 and about one inch from either side of the bag 14. It is advantageous to reinforce the pin hole 26. This can be done by applying a 5/16 inch diameter disc of adhesive-backed reinforcement member that is made of a polymeric material. The pin hole 26 extends through the reinforcement member and the side wall of the bag 14.

A fly (usually attached to a leader) is held over the pin hole 26, and the bag 14 is squeezed. The fumed silica floatant contained in the bag 14 exits through the pin hole 26 as a small cloud of air-dispersed silica. The small cloud envelopes the fly to coat the fly with the hydrophobic silica. The fly will then float beautifully on water. When such a treated fly was dropped into a tank of water at room temperature, the fly floated perfectly even after a month in the tank, indicating that the hydrophobic silica is held rather tenaciously to the fly. The blue wing olive dry fly that was cleaned in a manner described hereinbefore floated beautifully when following its cleaning and drying, it was exposed to one very small cloud of silica floatant which exited the pin hole 26 when the bag 14 was compressed gently. A polypropylene yarn strike indicator was treated with the cloud of silica floatant in a manner similar to the blue wing olive dry fly above. The treated indicator floated extremely high on the water and proved to be exceptionally sensitive as an indicator.

The second bag 14 can be compressed anywhere to produce the cloud of dispersed silica particles. The size of the cloud can be controlled by varying the force exerted on the bag 14. The bag 14 was compressed 1000 times over a period of one hour to give reproducible clouds without plugging the pin hole 26. At that point the pin hole 26 was deliberately pressed hard to determine how it would perform when stressed. The pin hole 26 became partially blocked and would not allow normal powder egress. The pin hole 26 was easily cleaned using a straight pin. The bag 14 was then compressed another 1000 times before the silica material in the bag 14 was spent.

Providing a Leader with a Hydrophobic Surface

A floating leader can act as a strike indicator. It can float over submerged rocks and debris without getting hung up. However, on a bright day a floating leader or tippet can scare fish. Various monofilaments used to make leaders and tippets are inherently hydrophobic and float provided they are not contaminated with hydrophilic substances such as scums. These contaminants can be removed easily using the hydrophilic thixotropic material contained in the first bag 12. The thixotropic material is contacted with the leader or tippet using one's fingers. The thixotropic material cleans the contaminants from the leader or tippet, and the residual thixotropic material is then rinsed off the leader or tippet. After being cleaned, rinsed and dried short sections of leader or tippet can be made to float extremely high in the water by being exposed to one or more clouds of silica floatant from bag 14.

Coating Leaders, Fly Lines, Nymphs, Wet Flies and Streamers to make them Sink The same hydrophilic formulations used to clean flies can be applied with the finger tips to the leader, flies and lines to aid in making such items sink. An Orvis 5×tippet was passed between the tips of the thumb and an index finger that was coated with the hydrophilic thixotropic material contained in bag 12. The tippet sank immediately when dropped into a tank of water at 68° F. The hydrophilic material was removed from the fingers by rinsing in water. The uncoated control floated.

The ease with which the coating of hydrophilic material could be applied uniformly increased as the amount of clay dispersed in the glycol mixture increased. The sink rate is also increased by increasing the amount of clay, i.e., increasing the specific gravity of the hydrophilic, thixotropic material. However, above about 60% clay, the thixotropic mixture is quite stiff and difficult to extrude, whereas with 40% to 50% clay, the thixotropic mixtures are easy to handle. Incorporation of powdered zinc oxide into the thixotropic mixtures produce rheologically acceptable thixotropic materials with significantly higher specific gravities and sink rates.

Hydrophilic formulations thixotroped with amorphous hydrophilic fumed silica work well. However, they are less dense than formulations employing bentonite clay and are much more expensive.

Cover and Wallet-like Construction of Device of Present Invention

The first and second drying pads 18 and 20 and the first and second bags 12 and 14 are held together in a wallet-like configuration as pointed out previously so that the components can be fanned open like the pages of a book. A cover 16 is advantageously provided to protect the drying pads 18 and 20 and the bags 12 and 14. The cover 16 is preferably made of a relatively thick (1/32 inch to 3/32 inch) flexible water-proof polymeric materials such as vinyls, rubber, polyolefins, nylons, coated paper and treated leather. Ranchide, an inexpensive vinyl imitation leather works well. Leather is more attractive but also much more expensive.

The cover advantageously can be made to be capable of also holding flies. The cover can be made of a material, such as a flexible magnetic sheet, that will hold flies. Alternatively, a wool patch or ripple foam can be attached to the cover 16 either permanently or with hook and pile fasteners.

The wallet-like device of the present invention, including the cover 16 can be held together at its bound upper edge with stitches, staples, bolts, binder clips or adhesives. The preferred method utilizes the screw and post holder 34 shown in FIG. 3. A binder clip 32 also works well as shown in FIGS. 1 and 2. Assembling and disassembling the wallet-like device is simple and fast when the screw and post holder 34 or the binder clip 32 is used to hold the device together. This makes it easy to replace any part of the wallet-like device that is worn or depleted.

Device for Applying Permanent Hydrophobic Coating to Items

The bag 14, either used alone or in a wallet-like device with the other bag 12 and drying pads 18 and 20, can be used to apply a permanent hydrophobic coating to an item, such as a fly. The bag 14 is charged with powdered polyethylene MP-22XF from Micro Powders, Inc. of Tarrytown, N.Y. The powder has a particle size of from about 5 $\mu$ to 6 $\mu$, a specific gravity of 0.94 and a melting point of between about 102° C. and 106° C. The powder resembles flour and would not flow until 0.10 grams of CAB-O-SIL TS-530 was mixed with it. The mixture was placed in the bag 14 and the bag 14 was sealed, agitated and compressed several times. When compressed, the bag 14 yielded the expected cloud of dispersed particulate material.

A new Orvis #12 Renegade dry fly was held over the pin hole 26 in the bag 14 and exposed to 3 clouds of the polyethylene/CAB-O-SIL TS-530 dispersion. The coated fly was held in an oven at a temperature slightly above 106° C. until the polyethylene component of the powder fused. The fly was then allowed to cool to room temperature. The fly floated beautifully. It was then contaminated with mucous taken from a trout's mouth. The contaminated fly sank when dropped into a tank of water. When agitated under the water and then snapped once to remove water from the fly, the fly floated as before.

The bag 24 containing the polyethylene/CAB-O-SIL TS-530 mixture can be used to apply a permanent hydrophobic coating to any item that can be exposed to the cloud or dispersion of polyethylene/CAB-O-SIL TS-530 from the pin hole 26 in the bag 24. The item is then heated to fuse the polyethylene and create a permanent coating on the item.

Although preferred embodiments of the present invention have been described, it is to be understood that the present disclosure is made by way of example and that various other embodiments are possible without departing from the subject matter coming within the scope of the following claims, which subject matter is regarded as the invention.

I claim:

1. A device for drying artificial flies used in fishing as well as for dispensing hydrophobic and hydrophilic substances to be applied to artificial flies used in fishing, said device comprising first and second, water absorbing, substantially planar, drying pads;

a first polymeric bag, said first polymeric bag being made of flexible polymeric side walls that are substantially planar and parallel with each other, with said side walls of said first polymeric bag being sealed together about the periphery of said side walls of said first polymeric bag to form an enclosed space between the side walls of said first polymeric bag;

a hydrophilic, thixotropic material comprising a thixotropic agent consisting of (1) bentonite clay or hydrophilic amorphous fumed silica and (2) a non-toxic, substantially non-volatile, liquid surfactant that contains hydroxyl or other polar groups, said hydrophilic, thixotropic material being contained inside said enclosed space between said side walls of said first polymeric bag; a small hole having an effective diameter no greater than about 1/8 inch, said hole being located closely adjacent to or at a lower corner of said first polymeric bag, such that the hydrophilic, thixotropic material will be retained in said first polymeric bag unless the first polymeric bag is squeezed to extrude the hydrophilic, thixotropic material from said first polymeric bag;

a second polymeric bag, said second polymeric bag being made of flexible polymeric side walls that are substantially planar and parallel with each other, with said side walls of said second polymeric bag being sealed together about the periphery of the side walls of said second polymeric bag to form an enclosed space between the side walls of said second polymeric bag;

a sheet of open celled, foamed polymeric material contained in said enclosed space between the side walls of said second polymeric bag;

finely powdered amorphous hydrophobic fumed silica contained in said enclosed space between the side walls of said second polymeric bag, with said fumed silica permeating the open cells of said sheet of open celled, foamed polymeric material;

a pin hole in one of the side walls of said second polymeric bag, said pin hole having an effective diameter of between about 10 and 50 mils, whereby when said second polymeric bag is squeezed an air dispersion in the form of a small cloud of fumed silica is ejected from said pin hole; and means for supporting said first and second drying pads and said first and second polymeric bags so that (1) said first and second drying pads lie alongside each other, (2) said first polymeric bag lies alongside said first drying pad, and (3) said second polymeric bag lies alongside said second drying pad.

2. A device in accordance with claim 1 further comprising a front protective cover;

a back protective cover;

said front protective cover extending downwardly along an outer side of one of said first and second polymeric bags so the bottom end of said front protective cover extends beyond lower ends of said first and second polymeric bags;

said back protective cover extending downwardly along an outer side of another of said first and second polymeric bags so that a bottom end of said back protective cover extends beyond lower ends of said first and second drying pads and said first and second polymeric bags; and attachment means for releasably attaching the bottom ends of said front and back covers together.

3. A device in accordance with claim 2 wherein said pin hole in said second polymeric bag is located on a side wall of said second polymeric bag that faces one of said front or back protective covers; and a layer of closed celled, foamed polymeric material is attached to an inside surface of said one of said front or back protective covers, so that when the bottom ends of said front and back protective covers are attached together, said layer of closed celled, foamed polymeric material is held in contact with said pin hole in said second polymeric bag.

4. A device in accordance with claim 1 wherein the peripheral dimensions of the first and second drying pads and the first and second polymeric bags are substantially the same.

5. A device in accordance with claim 1 wherein said hydrophilic, thixotropic material comprises bentonite clay and polyethylene glycol.

6. A device in accordance with claim 1 wherein said hydrophilic, thixotropic material comprises hydrophilic amorphous fumed silica and polyethylene glycol.

7. A dispenser for creating and dispersing an air dispersion of finely powdered material, said dispenser comprising a polymeric bag that is made of flexible polymeric side walls that are substantially planar and parallel with each other, with said side walls being sealed together about the periphery of the side walls of said polymeric bag to form an enclosed space between the side walls of said polymeric bag;

a sheet of open celled, foamed polymeric material contained in said enclosed space between the side walls of said polymeric bag;

a finely powdered material contained in said enclosed space between the side walls of said polymeric bag, with said powdered material permeating the open cells of said sheet of open celled, foamed polymeric material;

a pin hole in one of the side walls of said polymeric bag, said pin hole having an effective diameter of between about 10 and 50 mils, whereby when said polymeric bag s squeezed an air dispersion of finely divided material is ejected from said pin hole.

8. A dispenser in accordance with claim 7 wherein said finely powdered material comprises amorphous hydrophobic fumed silica.

9. A dispenser in accordance with claim 8 wherein said finely powdered amorphous fumed silica further comprises powdered polyethylene having a melting point of between about 102° C. to 106° C.

* * * * *